United States Patent
Yuan et al.

(10) Patent No.: US 10,326,573 B2
(45) Date of Patent: Jun. 18, 2019

(54) METHOD AND APPARATUS OF ALLOCATING SOUNDING REFERENCE SIGNAL RESOURCES

(71) Applicant: Samsung Electronics Co., Ltd, Gyeonggi-do (KR)

(72) Inventors: Fang Yuan, Beijing (CN); Bin Yu, Beijing (CN); Dalin Zhu, Beijing (CN); Pengfei Sun, Beijing (CN); Ming Lei, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 15/509,188

(22) PCT Filed: Sep. 3, 2015

(86) PCT No.: PCT/KR2015/009287
§ 371 (c)(1),
(2) Date: Mar. 6, 2017

(87) PCT Pub. No.: WO2016/036158
PCT Pub. Date: Mar. 10, 2016

(65) Prior Publication Data
US 2017/0288834 A1    Oct. 5, 2017

(30) Foreign Application Priority Data
Sep. 4, 2014  (CN) .......................... 2014 1 0448615

(51) Int. Cl.
*H04L 5/00* (2006.01)
*H04L 5/14* (2006.01)
*H04W 72/04* (2009.01)

(52) U.S. Cl.
CPC .......... *H04L 5/0048* (2013.01); *H04L 5/0026* (2013.01); *H04L 5/0028* (2013.01);
(Continued)

(58) Field of Classification Search
CPC ......... H04L 5/0048; H04L 5/14; H04W 72/04
See application file for complete search history.

(56) References Cited

U.S. PATENT DOCUMENTS

| | | | |
|---|---|---|---|
| 2012/0051265 A1* | 3/2012 | Shen | H04L 5/0035 370/254 |
| 2012/0155412 A1* | 6/2012 | Kawamura | H04J 11/003 370/329 |

(Continued)

OTHER PUBLICATIONS

Samsung, et al., "Coordination Schemes for Inter-eNB CoMP", 3GPP TSG RAN WG3 #83, R3-140396, Prague, Czech Republic, Feb. 10-14, 2014, 6 pages.
(Continued)

*Primary Examiner* — Lakeram Jangbahadur (57) ABSTRACT

The present disclosure relates to a pre-5$^{th}$-generation (5G) or 5G communication system to be provided for supporting higher data rates beyond 4$^{th}$-generation (4G) communication system such as a long term evolution (LTE). Various examples of the present disclosure provide a method of allocating sounding reference signal (SRS) resources. A base station of a target cell receives information of first cell edge terminals in an adjacent cell transmitted by the adjacent cell. The base station allocates SRS resources for a terminal in the target cell according to information of second cell edge terminals in the target cell and the information of the first cell edge terminals, and transmits information of the allocated SRS resources to the terminal. According to the mechanism, when there are cell edge terminals in both the target cell and the adjacent cell, it can be guaranteed that all SRS resources allocated to cell edge devices in the target cell are orthogonal to those allocated to cell edge devices in the adjacent cell. Thus, the impact of pilot contamination on system performances may be remarkably reduced.

10 Claims, 6 Drawing Sheets

(52) U.S. Cl.
CPC .......... *H04L 5/0035* (2013.01); *H04L 5/0069* (2013.01); *H04L 5/0091* (2013.01); *H04L 5/14* (2013.01); *H04W 72/04* (2013.01); *H04L 5/1438* (2013.01); *H04L 5/1469* (2013.01)

(56) References Cited

U.S. PATENT DOCUMENTS

| | | | |
|---|---|---|---|
| 2013/0231125 A1 | 9/2013 | Jeon et al. | |
| 2014/0036737 A1* | 2/2014 | Ekpenyong | H04W 8/245 370/280 |
| 2015/0171983 A1* | 6/2015 | Kusashima | H04J 11/004 370/329 |
| 2017/0099673 A1* | 4/2017 | Byun | H04W 72/10 |

OTHER PUBLICATIONS

Alcatel-Lucent Shanghai Bell, et al., "Performance Evaluation of X2 Signalling Supporting DL eCoMP with NIB", 3GPP TSG RAN WG1 Meeting #75, R1-135890, San Francisco, California, Nov. 11-15, 2013, 7 pages.

International Search Report dated Dec. 23, 2015 in connection with International Application No. PCT/KR2015/009287, 4 pages.

Written Opinion of the International Searching Authority dated Dec. 23, 2015 in connection with International Application No. PCT/KR2015/009287, 7 pages.

* cited by examiner

METHOD AND APPARATUS OF ALLOCATING SOUNDING REFERENCE SIGNAL RESOURCES

CROSS-REFERENCE TO RELATED APPLICATION(S)

The present application claims priority under 35 U.S.C. § 365 to International Patent Application No. PCT/KR2015/009287 filed Sep. 3, 2015, entitled "METHOD AND APPARATUS OF ALLOCATING SOUNDING REFERENCE SIGNAL RESOURCES", and, through International Patent Application No. PCT/KR2015/009287, to Chinese Patent Application No. 201410448615.0 filed Sep. 4, 2014, each of which are incorporated herein by reference into the present disclosure as if fully set forth herein.

TECHNICAL FIELD

The present disclosure relates to a method and apparatus of allocating resources, and more particularly to a method and apparatus of allocating sounding reference signal (SRS) resources.

BACKGROUND

To meet the demand for wireless data traffic, which has increased since deployment of $4^{th}$-generation (4G) communication systems, efforts have been made to develop an improved $5^{th}$-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (COMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

MIMO, one of key techniques for cellular mobile communication systems, can linearly increase the spectrum efficiency of a wireless communication system by effectively exploiting the spatial-domain resources. In order to enhance the spectrum efficiency, a transmitting end may first obtain channel state information (CSI) to perform common MIMO signal processing procedures such as precoding, beamforming, etc. to use the spatial domain resources effectively. Therefore, the key to performance improvement of a MIMO system lies in obtaining accurate CSI by the transmitting end.

In a time division duplexing (TDD) system, there is channel reciprocity between uplink channels and downlink channels. Thus, uplink channel information obtained from uplink channel estimation by a base station may be regarded as the equivalent of downlink channel information. Terminals may transmit sounding reference signals (SRS) in uplink channels to assist uplink channel estimation. The SRS is generated using specific pseudo-random sequences, e.g., Zadoff-Chu (ZC) sequences. Information of the sequences is already known by the terminals and base stations. After a ZC sequence is transmitted in an uplink channel, a base station may apply coherent detection and demodulation to a received signal sequence using a corresponding ZC sequence, and obtain estimated CSI of the uplink channel. The base station may perform MIMO signal processing, such as precoding, beamforming, etc., using the obtained CSI to improve system spectral efficiency.

Design of SRS resource mapping and allocation scheme is one of most important subjects in communication systems. Long term evolution (LTE) systems based on evolved universal terrestrial radio access (E-UTRA) standard of 3rd generation partnership project (3GPP) have dedicated SRS resource mapping and allocation scheme. Since there are limited numbers of orthogonal pseudo-random sequences, pseudo-random sequences allocated to different terminals may not be strictly orthogonal to each other. Base stations may allocate SRS resources to terminals using plural multiplexing methods. Specifically, SRS resources may refer to a pseudo random sequence used by the SRS, frequency domain resources, time domain resources, or code domain resources used for transmitting the SRS, or the like. For example, multiplexing methods in the frequency domain may include comb-type pilot arrangement, frequency-hopping, etc.; multiplexing methods in the code domain may include multiple pseudo-random sequences of different cyclic shifts (CS) of the same pseudo-random sequence, or the like.

Figure 1A:
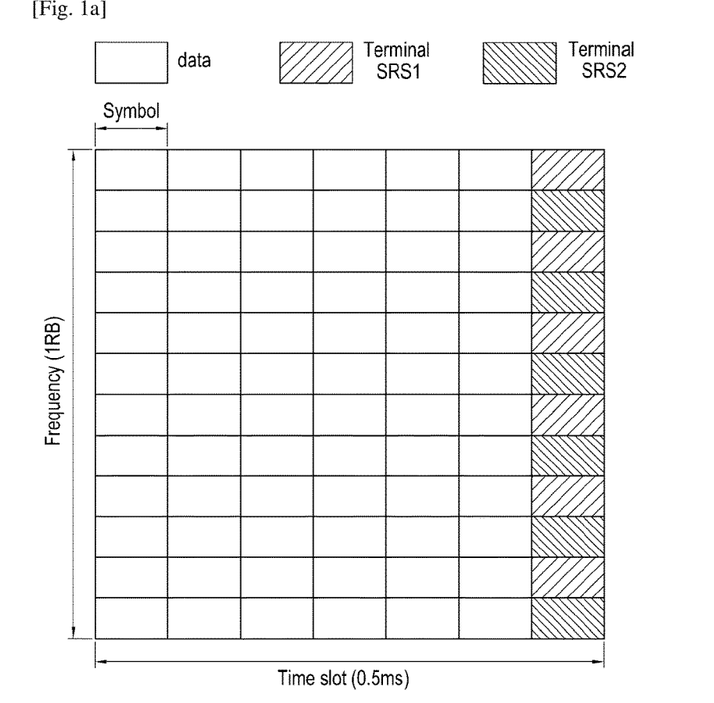
FIG. 1a is a schematic diagram illustrating a comb-type pilot arrangement.

FIG. 1a is a schematic diagram illustrating a comb-type pilot arrangement. In a time slot, resources of odd-numbered sub-carriers are allocated to terminal 1 for transmitting SRS1, and resources of even-numbered sub-carriers are allocated to terminal 2 for transmitting SRS2. SRS1 and SRS2 may be the same pseudo random sequence. Although SRS resources can be reused, LTE systems are still short of SRS resources. For example, in each time slot, at most 16 full-bandwidth SRS transmissions can be performed, which uses 2 comb-type pilots and 8 different pseudo-random sequences generated using different CSs. SRS is transmitted periodically in an LTE system. In order to further increase the system capacity for SRS and to accommodate more terminals, the LTE Advanced system introduces non-periodic SRS transmission into the LTE system, which enables a base station to configure a terminal to perform only one SRS transmission instead of multiple SRS transmissions according to practical requirements.

In the same cell, a base station may allocate orthogonal SRS resources to different terminals. When the terminals transmit SRS in respective uplink channels, SRS received from different terminals by the base station are orthogonal to each other, and the base station can obtain correct channel estimation results to obtain correct CSI of each uplink channel based on the received SRS. But SRS resources allocated to terminals in different cells may be not orthogonal to each other, i.e., the SRS resources may collide with each other. For example, an LTE system may use different CSs of different ZC root sequences as pseudo-random sequences of SRS resources allocated by different cells on the same time/frequency resources. Although different CSs of the same ZC root sequence are orthogonal to each other, pseudo-random sequences obtained from different ZC root sequences are not orthogonal to each other. Root sequences are allocated to different cells according to cell IDs. Thus, SRS resources of different cells are not orthogonal to each other.

When non-orthogonal SRS resources are allocated to terminals in different cells, a base station may receive uplink SRS signals from terminals of other cells when receiving uplink SRS signals from terminals in a local cell. The SRS signals received by the base station include interference of SRS signals transmitted by terminals in other cells. This is referred to as pilot contamination.

Figure 2:
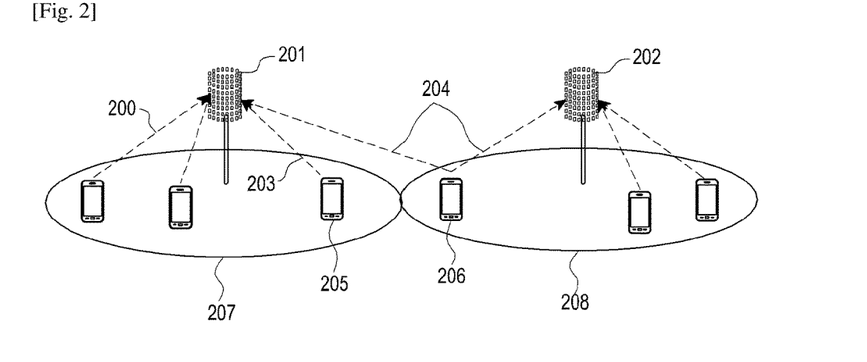
FIG. 2 is a schematic diagram illustrating pilot contamination.

FIG. 2 is a schematic diagram illustrating pilot contamination. When SRS1 and SRS2 are not orthogonal to each other, channel estimation performances may become worse due to the interference, and the accuracy of subsequent signal processing based on the channel estimation is also greatly reduced which reduces system capacity and spectral efficiency. When the number of antennas of a base station increases, the situation becomes worse.

Large-scale MIMO (or massive MIMO) is one of candidate techniques of the fifth generation (5G) cellular communication systems. Massive MIMO systems have sufficient spatial degrees of freedom in signal processing, thus can eliminate inter-terminal interference and inter-cell interference with low computational complexity (because only algorithms with linear computational complexity are involved). Theoretically, the uplink/downlink achievable signal-to-noise ratio (SNR) of massive MIMO systems increases with the number of antennas, thus the system capacity is increased remarkably. In practice, however, system capacity performance of massive MIMO systems is severely degraded by pilot contamination. Due to pilot contamination, massive MIMO systems may obtain poor channel estimations. The poor channel estimations may then results in severe co-channel interferences in subsequent processing, such as downlink pre-processing and uplink post-processing. The co-channel interferences may reduce or even eliminate the gain obtained from the massive antenna deployment, and the system capacity becomes interference-limited. Terminals located at the cell edge areas (simply referred to as cell edge terminals) are exposed to more serious pilot contamination than terminals located at the central area of a cell (simply referred to as cell center terminals), especially when terminals in different cells are all cell edge terminals of cells adjacent to each other. Thus, it is desirable to design a new scheme for SRS resources allocation which considers information such as different user locations, channel quality and user transmitting power to address the pilot contamination problem in massive MIMO systems and to increase system capacity.

Conventional LTE systems include TDD LTE systems and FDD LTE systems according to the different duplexing modes adopted by the systems. The TDD mode features asymmetric uplink/downlink traffic, according to which uplink/downlink time domain resources can be allocated flexibly by adjusting the uplink to downlink subframe ratio according to uplink/downlink traffic requirements. The TDD module, however, generates larger time delay, especially in processing hybrid automatic re-transmission requests (HARQ). Further, the TDD mode introduces interference between uplink and downlink, which increases the complexity of interference management. The FDD mode generates smaller time delay, and the interference management is less complex. Under the FDD mode, there is no uplink/downlink reciprocity. A base station cannot obtain CSI of a downlink channel from channel estimation of an uplink channel, and may rely on terminals to feed back CSI via additional resources, which in turn reduces system spectrum efficiency. In view of the foregoing, a hybrid division duplexing (HDD) mode is more flexible and efficient.

Figure 3A:
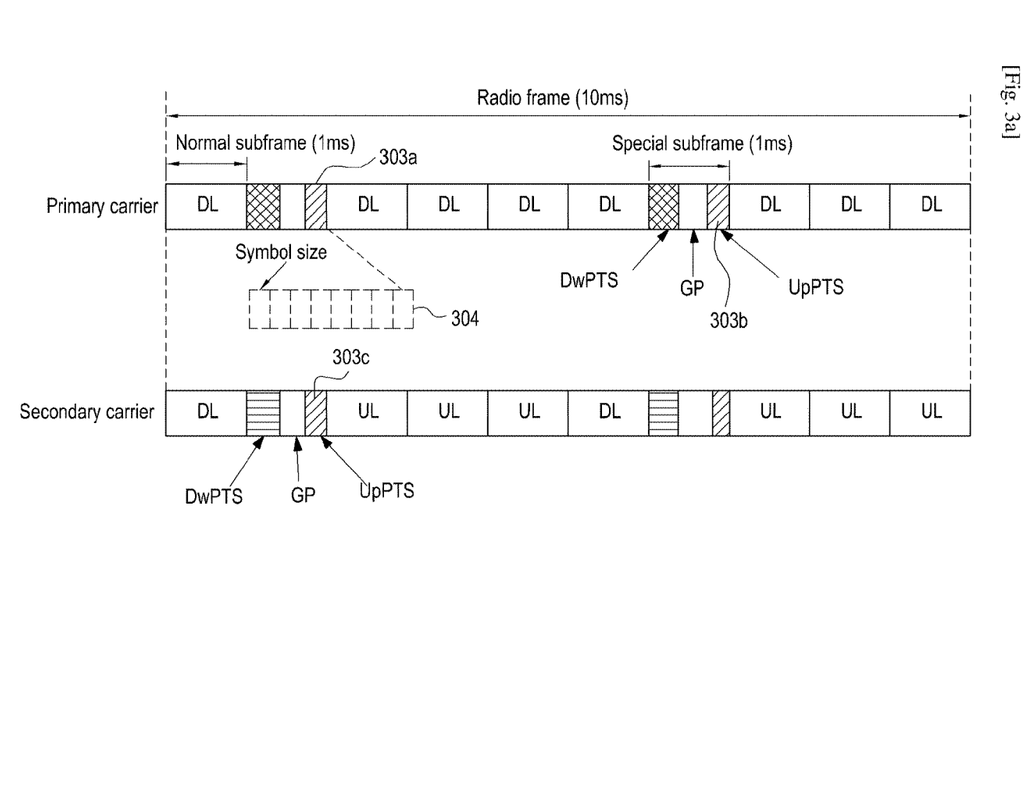
FIG. 3a is a schematic diagram illustrating a frame structure under the HDD mode.

FIG. 3a is a schematic diagram illustrating a frame structure in an HDD system. The HDD mode integrates the TDD mode and the FDD mode. In a cell adopting pairs of carriers, a user terminal may communicate with a base station over a primary carrier and a secondary carrier according to a pre-determined communication mode. Specifically, if all of subframes in the secondary carrier are uplink subframes, the user terminal may communicate with the base station over the primary carrier and the secondary carrier under the FDD mode. If subframes in the secondary carrier are multiplexed in the time domain into uplink subframes and downlink subframes, the user terminal may communicate with the base station using downlink resources in the primary carrier and uplink resources in the secondary carrier, or downlink resources in the secondary carrier and uplink resources in the secondary carrier, under the FDD mode. An HDD system adds an uplink subframe into a downlink frame structure in conventional LTE systems for the FDD mode. The uplink subframe is for purposes such as transmission synchronization, SRS transmission, and so on. The frame structure for the TDD mode remains unmodified. The HDD mode inherits advantages of both the TDD mode and the FDD mode in LTE systems, i.e., simple CSI feedback scheme which is implemented by channel estimation, short time delay, and asymmetric uplink/downlink traffic adaptation. Thus, the HDD mode is an important duplex scheme in future 5G cellular communication standards.

In massive MIMO systems, the increased number of antennas may result in a rapid increase in the number of accurate CSI required by base stations, and there is an urgent need of obtaining CSI in massive MIMO systems. Under the HDD mode, a base station may obtain CSI from channel estimation based on previous FDD downlink frame structure in a primary carrier and TDD downlink frame structure in a secondary carrier. Further, special subframes in a frame structure in a primary carrier may be specially designed to increase SRS capacity. Thus, it is desirable for a base station in a massive MIMO system to adopt the HDD mode with a proper SRS resources allocation scheme to effectively reduce the impact of pilot contamination on system performances, achieve the gain provided by the massive antenna array, and increase system capacity.

The above information is presented as background information only to assist with an understanding of the present disclosure. No determination has been made, and no assertion is made, as to whether any of the above might be applicable as prior art with regard to the present disclosure.

SUMMARY

Various examples provide a method and an apparatus of allocating SRS resources to reduce the influence of pilot contamination and increase the efficiency of SRS resources in a massive MIMO system.

To attain the above objective, various examples provide the following technical mechanisms.

A method of allocating resources in a base station of a first cell may include:

receiving information of first terminals transmitted by a second cell; and allocating resources to a terminal, which is one of second terminals, in the first cell based on information of the second terminals in the first cell and the information of the first terminals, and transmitting information of the allocated resources to the terminal, wherein the information of the first terminals includes a number of the first terminals and information of resources allocated to the first terminals, and wherein resources allocated to the second terminals are orthogonal to resources allocated to the first terminals in the second cell if there are third terminals in the first cell and the second cell, wherein, if the resources are orthogonal in a code-domain, the resources orthogonal in the code-domain comprise orthogonal signals generated by applying spreading to a pseudo-random sequence using different orthogonal spreading sequences from the same orthogonal matrix, and wherein each of the orthogonal spreading sequence is a row or a column of at least one of a discrete Fourier transformation (DFT) matrix and the orthogonal matrix.

A method of allocating resources in a base station of a first cell may include:

receiving information of first terminals transmitted by a second cell; and allocating resources to a terminal, which is one of second terminals, in the first cell based on information of the second terminals in the first cell and the information of the first terminals, and transmitting information of the allocated resources to the terminal, wherein the information of the first terminals includes a number of the first terminals and information of resources allocated to the first terminals, and wherein resources allocated to the second terminals are orthogonal to resources allocated to the first terminals in the second cell if there are third terminals in the first cell and the second cell, wherein, if the resources are orthogonal in a code-domain, the resources orthogonal in the frequency domain comprise orthogonal resources in frames adopting the same frame structure in a secondary carrier that are generated by applying different cyclic shift intervals to a root sequence, resources allocated to different first terminals in one cell or second terminals in different cells are generated by cyclic shift intervals larger than a pre-defined threshold if amount of available resources are less than a threshold, and resources allocated to a first terminal and a second terminal are generated based on cyclic shift intervals smaller than the threshold.

An apparatus of allocating sounding reference signal (SRS) resources may include:

a receiving unit configured to receive information of first terminals transmitted by a second cell; and a resource allocating unit configured to allocate resources to a terminal, which is one of second terminals, in the first cell based on information of the second terminals in the first cell and the information of the first terminals, and transmitting information of the allocated resources to the terminal, wherein the information of the first terminals includes a number of the first terminals and information of resources allocated to the first terminals, and wherein resources allocated to the second terminals are orthogonal to resources allocated to the first terminals in the second cell if there are third terminals in the first cell and the second cell, wherein, if the resources are orthogonal in a code-domain, the resources orthogonal in the code-domain comprise orthogonal signals generated by applying spreading to a pseudo-random sequence using different orthogonal spreading sequences from the same orthogonal matrix, and wherein each of the orthogonal spreading sequence is a row or a column of at least one of a discrete Fourier transformation (DFT) matrix and the orthogonal matrix.

An apparatus of allocating sounding reference signal (SRS) resources may include:

a receiving unit configured to receive information of first terminals transmitted by a second cell; and a resource allocating unit configured to allocate resources to a terminal, which is one of second terminals, in the first cell based on information of the second terminals in the first cell and the information of the first terminals, and transmitting information of the allocated resources to the terminal, wherein the information of the first terminals includes a number of the first terminals and information of resources allocated to the first terminals, and wherein resources allocated to the second terminals are orthogonal to resources allocated to the first terminals in the second cell if there are third terminals in the first cell and the second cell, wherein, if the resources are orthogonal in a code-domain, the resources orthogonal in the frequency domain comprise orthogonal resources in frames adopting the same frame structure in a secondary carrier that are generated by applying different cyclic shift intervals to a root sequence, resources allocated to different first terminals in one cell or second terminals in different cells are generated by cyclic shift intervals larger than a pre-defined threshold if amount of available resources are less than a threshold, and resources allocated to a first terminal and a second terminal are generated based on cyclic shift intervals smaller than the threshold.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

A method and apparatus proposed in an embodiment of the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, a mobile internet protocol (Mobile IP) system, and/or the like.

In order to make the objectives, technical schemes and merits of the present invention clearer, a detailed description of the present invention is hereinafter given with reference to specific embodiments.

According to various examples, when allocating sounding reference signal (SRS) resources to terminals, cell edge terminals in a target cell are allocated with SRS resources orthogonal to SRS resources allocated to cell edge terminals in an adjacent cell. Various examples also provide a fractional reuse mechanism to improve the utilization efficiency of SRS resources. The technical mechanism of various examples may also be applied to a millimeter wave communication system that have antenna arrays and transmits SRS using narrow beams.

In various examples, terminals in a cell may be classified into cell center terminals and cell edge terminals. In an example, a base station may classify terminals according to information such as the distance between the terminals and the base station, transmitting power of terminals, channel information, interference received by the terminal, or the like, to identify cell center terminals and cell edge terminals. Various methods may be used to classify the terminals as long as terminals at different locations can be distinguished. In an example, a base station may compare a first reference signal receiving power (RSRP) received by a terminal from the base station with a second RSRP received by the terminal from an adjacent cell. If the difference obtained by subtracting the second RSRP from the first RSRP is larger than a pre-defined threshold, the base station may determine the terminal is a cell center terminal. If the difference is smaller than the threshold, the base station may determine the terminal is a cell edge terminal. In other examples, the terminals may be classified according to reference signal receiving quality (RSRQ) or signal to interference plus noise ratio (SINR) fed back by the terminals, or according to two or any combination of RSRP, RSRQ and SINR. The RSRP, RSRQ and SINR may be measured by the terminals and reported to the base station. In an example, different SRS resources allocation policies may be applied to cell edge terminals and cell center terminals.

Figure 3B:
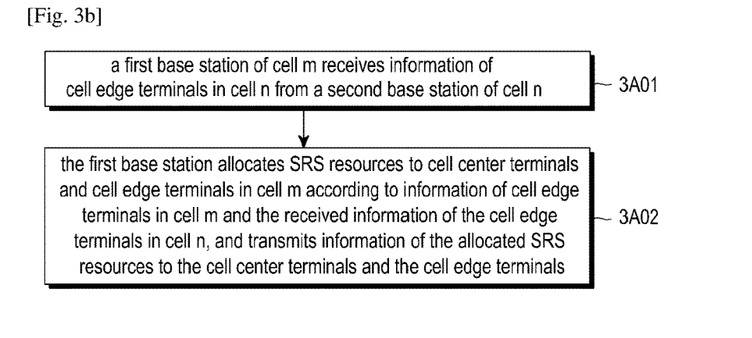
FIG. 3b is a flowchart illustrating a method of allocating SRS resources in accordance with an example of the present disclosure.

FIG. 3b is a flowchart illustrating a method of allocating SRS resources in accordance with an example of the present disclosure. As shown in FIG. 3b, the method may include the following procedures.

At block 3A01, a first base station of cell m receives information of cell edge terminals in cell n transmitted by a second base station of cell n.

The first base station and the second base station may exchange information via a standard communication interface. The standard communication interface may be an X2 interface or an S1 interface. In an example, the information of cell edge terminals may include information about the number of the cell edge terminals, SRS resources allocated to the cell edge terminals, or the like. In an example, the first base station may transmit information of second cell edge terminals in cell m to the second base station to enable the second base station to allocate SRS resources to terminals in cell n.

In an example, the adjacent cell is not necessarily in a geographically neighboring area. A cell may be determined as an adjacent cell according to the interference level. For example, a macro cell and a cell of a home evolved node B (eNB) may be determined to be adjacent cells.

At block 3A02, the first base station allocates SRS resources to cell center terminals and cell edge terminals in cell m according to information of cell edge terminals in cell m and the received information of cell edge terminals in cell n, and transmits information of the allocated SRS resources to the terminals. When there are cell edge terminals in both cell m and cell n, SRS resources allocated to cell edge terminals in cell m may be orthogonal to SRS resources allocated to cell edge terminals in cell n.

When there are cell edge terminals in both cell m and cell n, all of SRS resources allocated to cell edge terminals in cell m are not only orthogonal to each other, and also orthogonal to all of SRS resources allocated to cell edge terminals in cell n. As such, cell edge terminals in adjacent cells suffering from severe interference generated by each other may be allocated with orthogonal SRS resources, thus SRS signals from an adjacent cell may have reduced impact on coherent detection of SRS received by a base station. Therefore, the impact of pilot contamination on system performances may be reduced.

When there is no cell edge terminal in at least one of cell m and cell n, which means the pilot contamination may be not serious, a conventional SRS resources allocation scheme may be adopted. For example, the first base station may allocate SRS resources to terminals in cell m independently, i.e., no inter-cell coordination is required. Any feasible SRS resources allocation scheme may be adopted. This situation does not have the problem addressed by the present disclosure, thus the SRS resources allocation scheme used in this situation is not limited in the present disclosure.

The above is a complete process of allocating SRS resources according to an example. In the above example, two adjacent cells are taken as an example to illustrate the SRS resources allocation scheme. In other examples, the mechanism may be applied to any different cells instead of being limited to adjacent cells.

In an example, when there are cell edge terminals in both cell m and cell n, SRS resources allocated to cell center terminals in cell m may be partly or totally the same with SRS resources allocated to cell edge terminals in cell n, i.e., the above mentioned fractional reuse, to make full use of the limited SRS resources. As such, SRS resources can be reused while reducing the impact of pilot contamination to improve SRS resources utilization efficiency.

The following example one illustrates an example of a method of allocating SRS resources and fractional reuse of SRS resources. The example still takes two adjacent cells as an example. The interaction process between two base stations of the two cells is described to illustrate the SRS resources allocation process in the two cells. The SRS resources allocation in the two cells may be carried out in parallel.

Example One

Figure 3C:
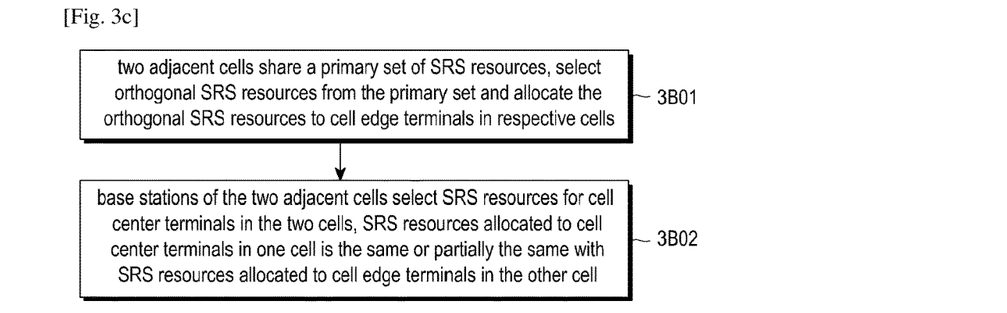
FIG. 3c is a flowchart illustrating a method of allocating SRS resources in accordance with example one of the present disclosure.

FIG. 3c is a flowchart illustrating a process of allocating SRS resources when there are cell edge terminals in both of two adjacent cells. The process may include the following procedures.

At block 3B01, base stations of two adjacent cells may share a primary set of SRS resources, and may allocate orthogonal SRS resources selected from the primary set to cell edge terminals in the two adjacent cells.

The two adjacent cells may be cells controlled by different base stations, or may be cells controlled by the same base station. The process is applicable to both situations, and this process takes adjacent cells controlled by different base stations as an example.

The primary set of SRS resources shared by the adjacent cells may be the union of sets of SRS resources allocated by the two adjacent cells, or a shared set of reserved SRS resources. During resources allocation, orthogonal SRS resources may be selected from the primary set of SRS resources to form a subset for each of the two adjacent cells, and the two subsets are referred to as first subsets. The number of orthogonal SRS resources in a first subset for one of the adjacent cells may be equal to or larger than the number of cell edge terminal in the cell. The SRS resources in the first subset are then allocated by a base station of the cell to cell edge terminals in the cell. In an example, supposing the two adjacent cells are cell 1 and cell 2, a first subset A is selected from the primary set of SRS resources for cell 1, and a first subset B is selected from the primary set for cell 2. The first subset A and the first subset B have no intersection, and SRS resources in the first subsets A and B are orthogonal to each other. As such, it can be guaranteed that cell edge terminals in cell 1 and cell 2 be allocated with orthogonal SRS resources. The following are a few examples of the method of selecting the first subsets.

(1) In an example, a centralized control method may be adopted. According to the method, a network control unit or a central control unit may select the first subsets for the adjacent cells.

(2) In an example, a distributed method may be adopted. According to the method, a base station configures SRS resources for a cell controlled by the base station. A configuration policy may be decided through interaction between base stations.

(3) In an example, cells coordinating with each other form a cell cluster. The first subset of each of the adjacent cells may be determined by a network controller of the cell cluster or by a primary base station in the cell cluster.

The base station may not change SRS resources that have been allocated to a cell edge terminal. When allocating SRS resources to a new cell edge terminal, the base station may allocate orthogonal SRS resources in the primary set that have not been allocated to the new cell edge terminal.

In an example, when a cell edge terminal completes transmitting the allocated SRS resources, the base station of the cell may update the SRS resources by adding the SRS resources into the primary set of SRS resources.

At block 3B02, base stations of two adjacent cells may select SRS resources from the primary set and allocate the SRS resources to cell center terminals in the two cells. The SRS resources allocated to a cell center terminal in one cell may be the same or partially the same with SRS resources allocated to a cell edge terminal in the other cell.

In an example, during SRS resources allocation to cell center terminals in the two adjacent cells, SRS resources orthogonal to SRS resources in the first subset of a cell are selected from the primary set to form a subset (referred to as a second subset) for the cell. SRS resources selected from the second subset are allocated to a cell center terminal in the cell. In an example, all of SRS resources in a first subset and all of SRS resources in a second subset of a cell are orthogonal to each other. SRS resources in the second subset of a cell are orthogonal to each other. SRS resources in the two second subsets of the two adjacent cells may not be necessarily orthogonal to each other.

In the example of the network environment in block 3B01, SRS resources in the second subset C of cell 1 may be orthogonal, or quasi-orthogonal, or not orthogonal to SRS resources in the second subset D of cell 2.

The second subset C may be the complement set of the first subset A in the primary set, or may be a proper subset of the complement set of the first subset A. The second subset D may be the complement set of the first subset B in the primary set, or may be a proper subset of the complement set of the first subset B.

SRS resources may be reused by two adjacent cells to increase the utilization efficiency of SRS resources. The following are examples of reusing the SRS resources.

In an example, SRS resources in the second subset C are identical to SRS resources in the first subset B, and SRS resources in the second subset D are identical to SRS resources in the first subset A. As such, SRS resources allocated to cell edge terminals in cell 1 are the same with SRS resources allocated to cell center terminals in cell 2, SRS resources allocated to cell edge terminals in cell 2 are the same with SRS resources allocated cell center terminals in cell 1, and the SRS resources reuse factor is 1.

In an example, SRS resources in the second subset C are partly the same with SRS resources in the first subset B, and SRS resources in the second subset D are partly the same with SRS resources in the first subset A. As such, SRS resources allocated to cell edge terminals in cell 1 are the same with SRS resources allocated to some cell center terminals in cell 2, SRS resources allocated to cell edge terminals in cell 2 are the same with SRS resources allocated to some cell center terminals in cell 1, and the SRS resources reuse factor is smaller than 1.

In the above examples, the SRS resources utilization efficiency is larger when the reuse factor is 1. But the reuse scheme lacks flexibility in interference avoidance schemes. The SRS resources utilization efficiency is lower when the reuse factor is smaller than 1. But in multi-cell environment, there is more flexibility in allocation of orthogonal resources to avoid resources collision. The reuse method of the former example may be referred to as full reuse of SRS resources, and the reuse method of the latter example may be referred to as fractional reuse of SRS resources. In an example, the former reuse method may be regarded as a special example of the latter reuse method, thus the two reuse methods may both be called fractional reuse.

Hence, the process of example one is completed.

The above examples all takes a process of allocating SRS resources in two cells as an example. In other examples, the process are also applicable to situations when the number of cells is M (M is an integer larger than 2), and the relation between the SRS resources of the cells and the processing of the SRS resources are similar to those described above. The SRS resources allocation in the M cells may be implemented in one process, instead of applying the method to each cell or every two cells.

The SRS resources may be orthogonal in different domains, i.e., correlation between two SRS resources is zeros. The SRS resources may be orthogonal in, but not limited to, the frequency domain, the time domain, the code domain, the spatial domain, or any or any combination of the above domains. The following examples 2 to 5 illustrate methods of obtaining orthogonal SRS resources in different resources domains.

FIG. 3a is a schematic diagram illustrating a frame structure in a hybrid division duplexing (HDD) communication system. The HDD communication system adopts the frame structure of an LTE system, including guard period (GP), cyclic prefix (CP), radio frame length and subframe length. For a normal CP, a subframe may include 14 symbols, with each symbol period of 66.7 us. The length of CP of the first symbol corresponds to 5.21 us, and the length of CP of the rest of 6 symbols is 4.69 us. For an extended CP, a subframe may include 12 symbols, and each symbol includes a CP of length 16.67 us.

As shown in FIG. 3a, the HDD communication system may include pairs of carrier. The frame structure of a primary carrier may include a special subframe. The special subframe may include three parts, i.e., a downlink pilottime slot, a guard period and an uplink pilot time slot. In the primary carrier, a primary synchronization signal (PSS), a secondary synchronization signal (SSS) and a physical broadcasting channel (PBCH) are used by terminals for cell search, and are transmitted in a downlink pilot time slot in the special subframe. Similar to the LTE system, the primary carrier may also include a dynamic broadcasting channel (DBCH). A physical downlink control channel (PDCCH) may schedule and indicate the DBCH, bear other system information blocks except the master information block (MIB).

A base station in the HDD communication system may perform downlink transmission in downlink subframes and downlink pilot time slots of the primary carrier, and receive SRS in uplink pilot time slots in special subframes of the primary carrier.

A user terminal in the HDD communication system may perform cell search on the primary carrier, perform downlink synchronization, obtain a cell ID, and decode broadcast information in the primary carrier.

Broadcast messages transmitted by the base station may include configuration information of special subframes, the carrier frequency and bandwidth of the secondary carrier, and configuration information about the radio frame structure of the secondary carrier.

The user terminal may communicate with the base station over the primary carrier and the secondary carrier according to a pre-determined communication mode. In an example, if the subframes in the secondary carrier are all uplink subframes, the user terminal may communicate with the base station over the primary carrier and the secondary carrier under the FDD mode. If the secondary carrier is time division multiplexed by uplink and downlink, the user terminal may communicate with the base station using downlink resources in the primary carrier and uplink resources in the secondary carrier under the FDD mode. In another example, if the secondary carrier is time division multiplexed by uplink and downlink, the user terminal may communicate with the base station using downlink resources in the secondary carrier and uplink resources in the secondary carrier under the TDD mode.

Examples 2 to 4 provide methods of obtaining orthogonal SRS resources in the primary carrier under the HDD mode. According to the methods, the SRS resources are orthogonal in the time domain, frequency domain and code domain respectively.

Example Two

Figure 4:
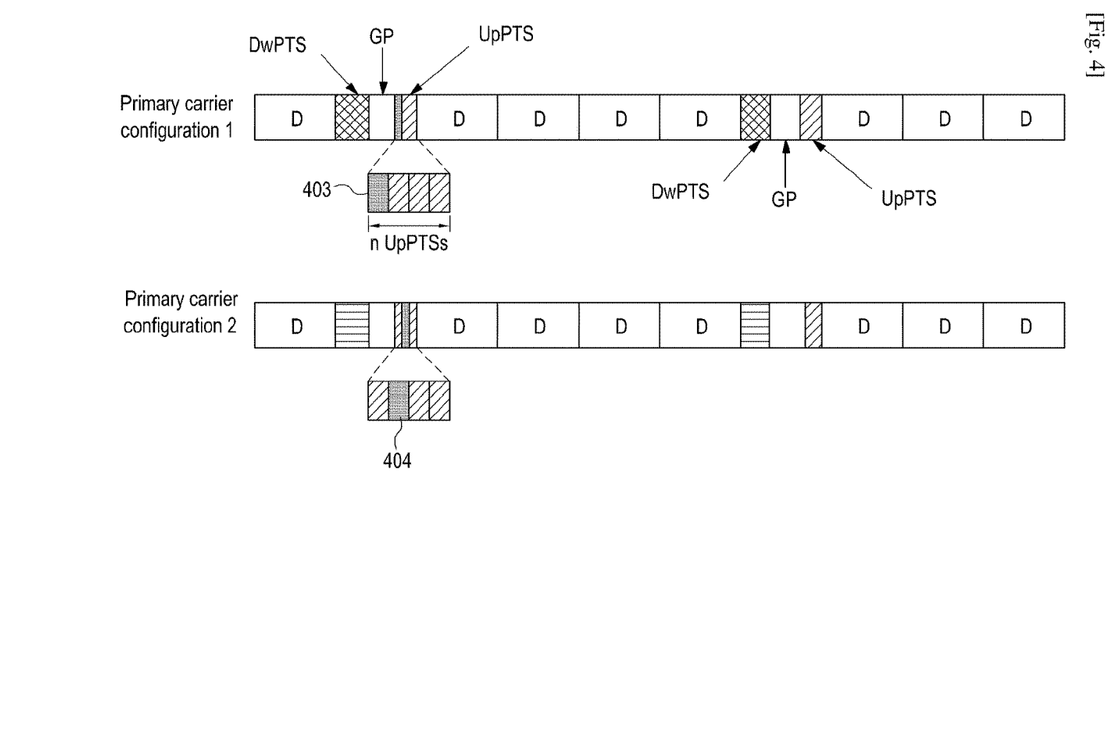
FIG. 4 is a schematic diagram illustrating a special subframe including plural UpPTS in a primary carrier under the HDD mode.
Figure 5:
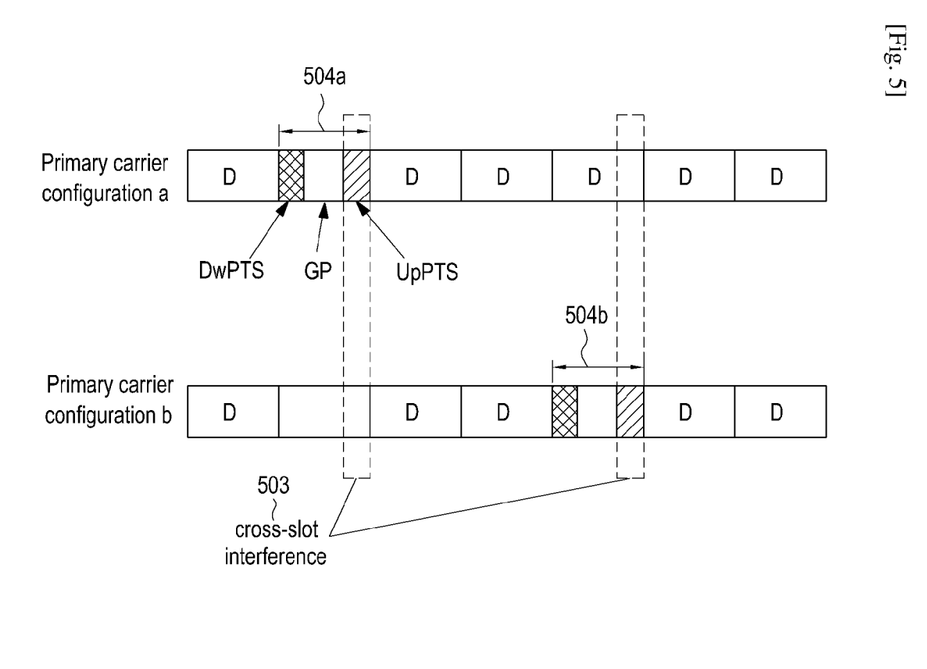
FIG. 5 is a schematic diagram illustrating special subframes at different positions of a primary carrier under the HDD mode.

I) FIG. 4 and FIG. 5 illustrate a method of obtaining orthogonal SRS resources in the time domain of the primary carrier under the HDD mode.

I-A) The primary carrier under the HDD mode includes a special subframe. The special subframe may include plural uplink pilot time slot (UpPTS) resources. A base station may allocate different UpPTS to different terminals so that SRS resources of the terminals are orthogonal in the special subframe in the time domain. That is, SRS resources in different UpPTS are orthogonal to each other. As shown in FIG. 4, special subframes in primary carrier configuration 1 and primary carrier configuration 2 may both include plural UpPTS in different time slots. SRS resources of 403 and 404 belong to different time domains, and they are orthogonal to each other. Taking the network shown in FIG. 2 as an example, base station 201 may configure SRS resources 403 for uplink of terminal 205, and base station 202 may configure SRS resources 404 for uplink 204 of terminal 206. As such, terminals 205 and 206 are allocated with orthogonal SRS resources.

I-B) The primary carrier under the HDD mode may include a special subframe. The position of the special subframe in a radio frame may be flexible. Different terminals may be configured with primary carriers in which the special subframes are at different positions, thus the SRS resources of the terminals may be orthogonal to each other in the time domain within the frame. That is, SRS resources in special subframes at different positions in the primary carrier are orthogonal to each other. As shown in FIG. 5, special subframes in primary carrier configuration a and primary carrier configuration b are at different positions, denoted as 504a and 504b. SRS resources of 504a and 504b belong to different time domains, and are orthogonal to each other. Taking the network shown in FIG. 2 as an example, base station 201 may configure primary carrier configuration a to uplink 203 of terminal 205. Terminal 205 may transmit SRS in special subframe 504a. Base station 202 may configure primary carrier configuration b to uplink 204 of terminal 206. Terminal 206 may transmit SRS in special subframe 504b. As such, SRS signals transmitted by terminal 205 and terminal 206 are orthogonal to each other.

In an example, when the primary carrier configurations a and b are allocated to cell edge terminals 205 and 205 in two adjacent cells and terminal 205 transmit SRS to base station 201, if base station 202 transmits downlink data to terminal 206, cross-slot co-channel interference 503 may occur, i.e., data signal transmitted by base station 202 may generate interference to signal reception of base station 201. In this situation, base station 202 may schedule a terminal whose beamforming causes less interference to base station 201 as the terminal 206. In an example, the method in I-B) may be applied to small cells, especially when the transmission power of a base station is low, to reduce inter-cell cross-slot interference.

Example Three

Figure 6:
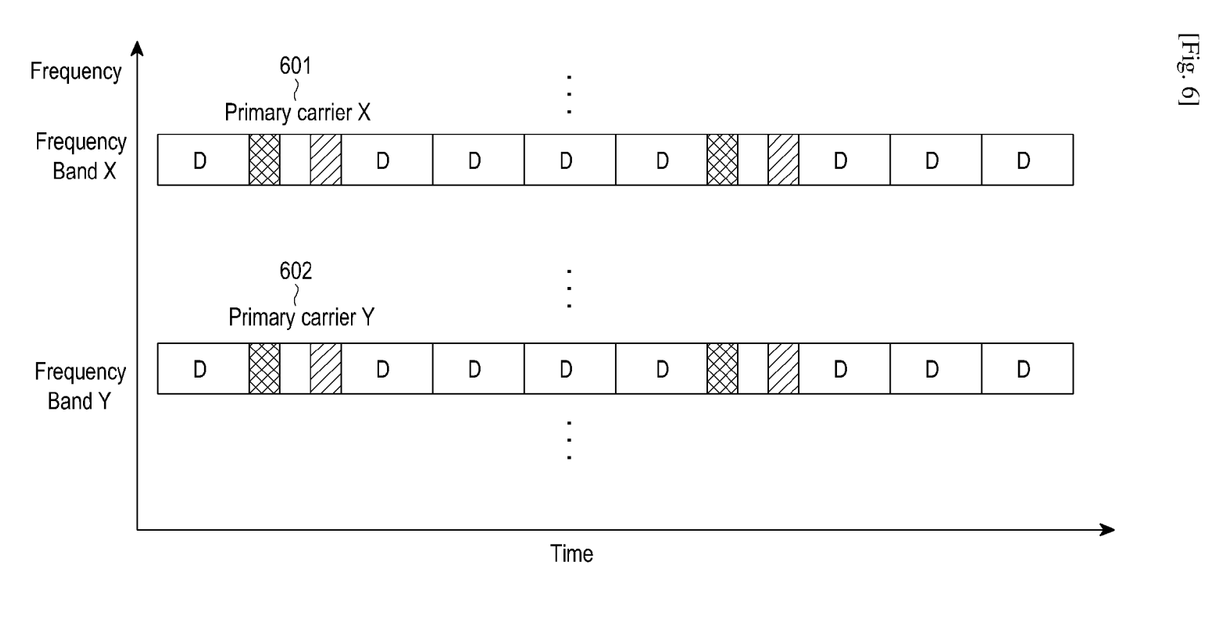
FIG. 6 is a schematic diagram illustrating primary carriers on different frequency bands under the FDD mode.

II) FIG. 6 illustrates a method of obtaining orthogonal SRS resources in the frequency domain of the primary carrier under the HDD mode.

Under the HDD mode, primary carriers may be allocated with different frequency-domain resources. A base station may allocate primary carriers with different frequency bands to different terminals. Since the frequency-domain resources are orthogonal to each other, the SRS resources of the terminals are also orthogonal to each other. As shown in FIG. 6, primary carrier X and primary carrier Y use different frequency-domain resources in a downlink frequency band. One or plural base stations may allocate the primary carriers with different frequency bands to different terminals as orthogonal SRS resources. For example, base stations of adjacent cells may allocate primary carriers using different frequency bands to cell edge terminals in respective cells as orthogonal SRS resources. Different cell edge terminals in adjacent cells may be allocated with frequency bands with large guard intervals to reduce the impact of pilot contamination brought by spectrum leakage.

As shown in FIG. 6, 601 is a primary carrier on frequency band X, 602 is a primary carrier on frequency band Y. 601 and 602 are different frequency-domain resources in the downlink frequency band. SRS resources in primary carrier 601 are orthogonal to SRS resources in primary carrier 602. Base station 201 as shown in FIG. 2 may allocate the primary carrier using frequency-domain resources 601 to uplink 203 of terminal 205, base station 202 may allocate the primary carrier using frequency-domain resources 602 to uplink 204 of terminal 206. As such, SRS resources of terminals 205 and 206 are orthogonal to each other in the frequency domain.

Example Four

Figure 7:
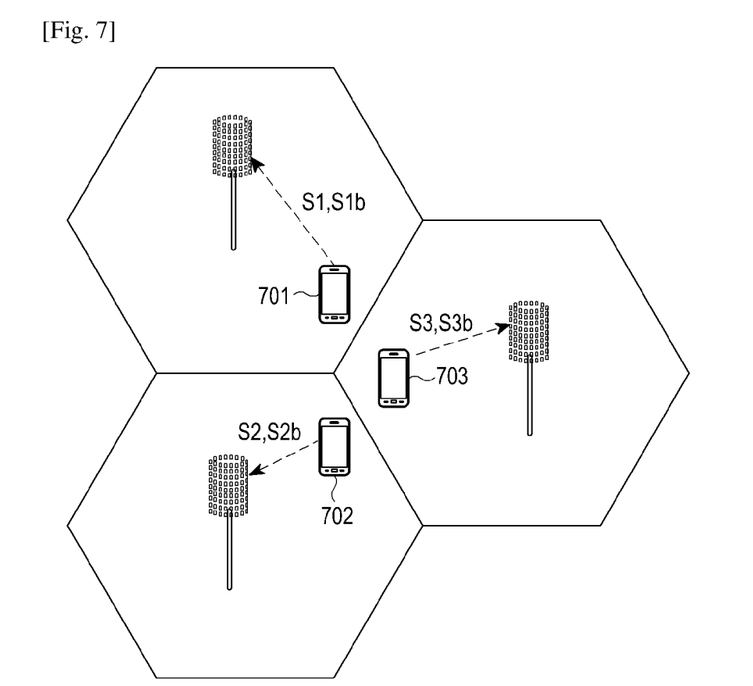
FIG. 7 is a schematic diagram illustrating an allocation scheme of enhanced SRS using orthogonal spreading codes under the HDD mode.

III) FIG. 7 illustrates a method of obtaining orthogonal SRS resources in the code domain.

Pseudo-random sequence resources for SRS may have enhanced orthogonality condition when different cells employ different code domains to reduce influence of pilot contamination. In an example, an SRS sequence may be generated using a pseudo-random sequence, e.g., a ZC sequence, and an orthogonal spreading code. When transmitting an SRS signal, a terminal may process the pseudo-random sequence through spreading with the orthogonal spreading sequence, and transmit the processed sequence in plural time slots. The base station may receive the SRS signal from the plural time slots. The base station may allocate different orthogonal spreading sequences to different terminals to enhance the orthogonality condition between SRS resources. The orthogonal spreading sequences may be any existing orthogonal spreading sequences. In an example, an orthogonal spreading sequence may be any row or any column of an N*N DFT matrix or an N*N orthogonal matrix. N is the number of time slots for transmitting the SRS signal after the spreading operation. Thus, orthogonal SRS signals may be generated by spreading a pseudo-random sequence using different orthogonal spreading sequences obtained from an orthogonal matrix or a DFT matrix. In an example, the dimension N of the DFT matrix or the orthogonal matrix may be determined according to the number of terminals in adjacent cells that need to generate SRS resources orthogonal to that generated by each other using the orthogonal spreading sequences.

As shown in FIG. 7, in the three cells of the system, pseudo random-sequence S1 and orthogonal spreading sequence S1b are allocated to terminal 701; pseudo-random sequence S2 and orthogonal spreading sequence S2b are allocated to terminal 702; pseudo-random sequence S3 and orthogonal spreading sequence S3b are allocated to terminal 703. The three cell edge terminals 701, 702 and 703 in the three adjacent cells respectively performs spreading to pseudo-random sequences S1, S2 and S3 using orthogonal spreading sequences S1b, S2b and S3b to generate respective SRS signals.

Orthogonal codewords S1b, S2b and S3b may be rows or columns of a 3*3 DFT matrix or a 3*3 orthogonal matrix.

Example 5 provides a method of obtaining orthogonal SRS resources in the secondary carrier under the HDD mode. According to the methods, the SRS resources are orthogonal in the time domain, frequency domain and code domain respectively.

Example Five

Figure 1B:
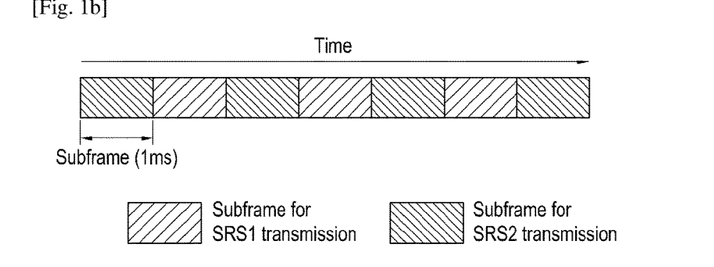
FIG. 1b is a schematic diagram illustrating different subframe offsets of SRS.

IV) FIG. 1a and FIG. 1b illustrate a method of obtaining orthogonal SRS resources in the secondary carrier under the HDD mode.

A secondary carrier under the HDD mode may use a conventional frame structure or a newly defined frame structure. When different terminals use the same frame structure in one secondary carrier, the method of obtaining orthogonal SRS resources may be as follows.

IV-A) Different frequency-domain parameters of a pseudo-random sequence may be configured to different terminals to make frequency-domain resources of SRS transmission by different terminals orthogonal to each other. The frequency-domain parameters may include SRS bandwidth, SRS frequency hopping bandwidth, the odd/even position of an initial carrier of an SRS sequence. As shown in FIG. 1a, an SRS sequence allocated by a first base station of a first cell to a cell edge terminal in the first cell and an SRS sequence allocated by a second base station of a second cell to a cell edge terminal in the second cell may locate at different even/odd positions in the frequency-domain so as to be orthogonal to each other. That is, SRS resources whose pseudo-random sequences adopt different frequency-domain parameters in the same secondary carrier using the same frame structure are orthogonal to each other.

IV-B) Different time-domain parameters of pseudo-random sequences may be configured to different terminals to make SRS resources of different terminals orthogonal to each other in the time domain. The time-domain parameters may include an SRS transmission periodicity, subframe offset for SRS transmission, or the like.

In an example, N evenly spaced subframe offset for SRS transmission may be configured for N terminals that have the same SRS transmission periodicity. FIG. 1b illustrates different subframe offsets for SRS transmission configured for two terminals whose SRS transmission periodicity is 2 ms. SRS signals transmitted by the two terminals are SRS1 and SRS2. When SRS resources are reused, SRS1 may be allocated to a cell edge terminal in a first cell, SRS2 may be allocated to cell edge user in a second cell. SRS1 and SRS2 are the same resources.

IV-C) Different cyclic shift intervals are configured for terminals using the same root sequence to make SRS resources of different terminals orthogonal to each other in the code domain. According to characteristics of ZC sequences, different cyclic shifted sequences of a ZC sequence are orthogonal to each other.

In an example, when there is insufficient SRS resources, different cell edge terminals in a cell or different cell center terminals may be configured with cyclic shift intervals that are larger than a pre-defined threshold, and cell edge terminals and cell center terminals in the same cell may be configured with cyclic shift intervals that are smaller than the pre-defined threshold.

The above are several examples of the SRS resources allocation method of the present disclosure.

Various examples also provide an apparatus of allocating SRS resources. The apparatus may implement the above SRS resources allocation method.

Figure 8:
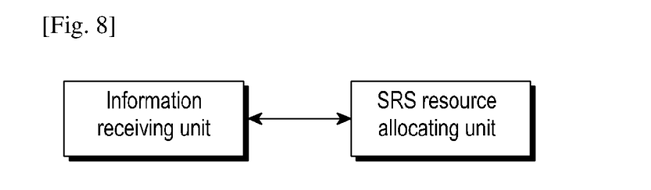
FIG. 8 is a schematic diagram illustrating modules of an apparatus of allocating SRS resources in accordance with an example of the present disclosure.

FIG. 8 is a schematic diagram illustrating a structure of an apparatus of allocating SRS resources in accordance with an example of the present disclosure. The apparatus may be in a base station. The apparatus may include: an information receiving unit and an SRS resource allocating unit.

The information receiving unit may receive information of first cell edge terminals transmitted by an adjacent cell; wherein terminals in a cell include cell edge terminals and cell center terminals, the information comprises the number of the first cell edge terminals and information of SRS resources allocated to the first cell edge terminals;

the SRS resource allocating unit may allocate SRS resources to a terminal in a local cell according to information of cell edge terminals in the local cell and the information of the first cell edge terminals. When there are cell edge terminals in both the local cell and the adjacent cell, SRS resources allocated to cell edge terminals in the local cell and the adjacent cell are orthogonal to each other.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of allocating resources in a base station of a first cell, the method comprising:
   receiving information of first terminals transmitted by a second cell, the first terminals being located in the second cell;
   allocating resources to a terminal, which is one of second terminals in the first cell, based on information of the second terminals in the first cell and the information of the first terminals, and transmitting information of the allocated resources to the terminal; and
   allocating resources selected from a primary set of resources to the terminal in the first cell,
   wherein the information of the first terminals includes a number of the first terminals and information of resources allocated to the first terminals,
   wherein resources allocated to the second terminals in the first cell are orthogonal to the resources allocated to the first terminals in the second cell if there are at least one of the second terminals in the first cell and at least one of the first terminals in the second cell,
   wherein, if the resources are orthogonal in a code-domain, the resources orthogonal in the code-domain comprise orthogonal signals generated by applying spreading to a pseudo-random sequence using different orthogonal spreading sequences from a same orthogonal matrix,
   wherein each of the orthogonal spreading sequences is a row or a column of at least one of a discrete Fourier transformation (DFT) matrix and the orthogonal matrix,
   wherein the first cell and the second cell share the primary set of resources if there are at least one of the second terminals in the first cell and at least one of the first terminals in the second cell, and
   wherein allocating the resources to the terminal in the first cell if there are the at least one of the second terminals in the first cell and the at least one of the first terminals in the second cell comprises:
      selecting, from the primary set of resources, a first resource subset which has no intersection with a second resource subset selected by the second cell for the first terminals; and
      allocating resources, from the first resource subset, to the terminal,
      wherein resources in the first resource subset are orthogonal to resources in the second resource subset.

2. The method of claim 1, further comprising:
   allocating resources allocated to one of the first terminals in the second cell to another terminal in the first cell.

3. The method of claim 1, further comprising:
   allocating resources to the terminal in the first cell independently if there is no other terminal in at least one of the first cell and the second cell.

4. A method of allocating resources in a base station of a first cell, the method comprising:
   receiving information of first terminals transmitted by a second cell, the first terminals being located in the second cell;
   allocating resources to a terminal, which is one of second terminals in the first cell based on information of the second terminals in the first cell and the information of the first terminals, and transmitting information of the allocated resources to the terminal; and allocating resources selected from a primary set of resources to the terminal in the first cell, wherein the information of the first terminals includes a number of the first terminals and information of resources allocated to the first terminals, wherein resources allocated to the second terminals in the first cell are orthogonal to the resources allocated to the first terminals in the second cell if there are at least one of the second terminals in the first cell and at least one of the first terminals in the second cell, wherein, if the resources are orthogonal in a code domain, the resources orthogonal in a frequency domain comprise orthogonal resources in frames adopting a same frame structure in a secondary carrier that are generated by applying different cyclic shift intervals to a root sequence, resources allocated to cell edge terminals in one cell or cell center terminals in different cells are generated by cyclic shift intervals larger than a predefined threshold if an amount of available resources is less than a threshold, and resources allocated to a cell edge terminal and a cell center terminal are generated based on cyclic shift intervals smaller than the threshold, wherein the first cell and the second cell share the primary set of resources if there are at least one of the second terminals in the first cell and at least one of the first terminals in the second cell, and wherein allocating the resources to the terminal in the first cell if there are the at least one of the second terminals in the first cell and the at least one of the first terminals in the second cell comprises:

selecting, from the primary set of resources, a first resource subset which has no intersection with a second resource subset selected by the second cell for the first terminals; and allocating resources, from the first resource subset, to the terminal, wherein resources in the first resource subset are orthogonal to resources in the second resource subset.

5. The method of claim 4, wherein allocating the resources to the terminals in the first cell if there are the at least one of the second terminals in the first cell and the at least one of the first terminals in the second cell comprises:

selecting, from the primary set of resources, a third resource subset which has no intersection with the first resource subset; and allocating resources, from the third resource subset, to another terminal in the first cell, wherein the third resource subset has shared resources with the second resource subset.

6. An apparatus for allocating sounding reference signal (SRS) resources, the apparatus comprising:

a receiving unit configured to receive information of first terminals transmitted by a second cell, the first terminals being located in the second cell; and a resource allocating unit configured to allocate resources to a terminal, which is one of second terminals in a first cell, based on information of the second terminals in the first cell and the information of the first terminals, transmit information of the allocated resources to the terminal, allocate resources selected from a primary set of resources to the terminal in the first cell, select, from the primary set of resources, a first resource subset which has no intersection with a second resource subset selected by the second cell for the first terminals, and allocate resources from the first resource subset to the terminal, wherein the information of the first terminals includes a number of the first terminals and information of resources allocated to the first terminals, wherein resources allocated to the second terminals in the first cell are orthogonal to the resources allocated to the first terminals in the second cell if there are at least one of the second terminals in the first cell and at least one of the first terminals in the second cell, wherein, if the resources are orthogonal in a code-domain, the resources orthogonal in the code-domain comprise orthogonal signals generated by applying spreading to a pseudo-random sequence using different orthogonal spreading sequences from a same orthogonal matrix, wherein each of the orthogonal spreading sequence is a row or a column of at least one of a discrete Fourier transformation (DFT) matrix and the orthogonal matrix, wherein the first cell and the second cell share the primary set of resources if there are at least one of the second terminals in the first cell and at least one of the first terminals in the second cell, and wherein resources in the first resource subset are orthogonal to resources in the second resource subset.

7. The apparatus of claim 6, wherein the resource allocating unit is further configured to allocate resources allocated to one of the first terminals in the second cell to another terminal in the first cell.

8. The apparatus of claim 6, wherein the resource allocating unit is further configured to:

allocate resources to the terminal in the first cell independently if there is no other terminal in at least one of the first cell and the second cell.

9. An apparatus for allocating sounding reference signal (SRS) resources, the apparatus comprising:

a receiving unit configured to receive information of first terminals transmitted by a second cell, the first terminals being located in the second cell; and a resource allocating unit configured to allocate resources to a terminal, which is one of second terminals in a first cell, based on information of the second terminals in the first cell and the information of the first terminals, transmit information of the allocated resources to the terminal, allocate resources selected from a primary set of resources to the terminal in the first cell, select, from the primary set of resources, a first resource subset which has no intersection with a second resource subset selected by the second cell for the first terminals, and allocate resources from the first resource subset to the terminal, wherein the information of the first terminals includes a number of the first terminals and information of resources allocated to the first terminals, wherein resources allocated to the second terminals in the first cell are orthogonal to the resources allocated to the first terminals in the second cell if there are at least one of the second terminals in the first cell and at least one of the first terminals in the second cell, wherein, if the resources are orthogonal in a code-domain, the resources orthogonal in a frequency domain comprise orthogonal resources in frames adopting a same frame structure in a secondary carrier that are generated by applying different cyclic shift intervals to a root sequence, resources allocated to cell edge terminals in one cell or cell center terminals in different cells are generated by cyclic shift intervals larger than a predefined threshold if an amount of available resources is less than a threshold, and resources allocated to a cell edge terminal and a cell center terminal are generated based on cyclic shift intervals smaller than the threshold, wherein the first cell and the second cell share the primary set of resources if there are at least one of the second terminals in the first cell and at least one of the first terminals in the second cell, and wherein resources in the first resource subset are orthogonal to resources in the second resource subset.

10. The apparatus of claim 9, wherein the resource allocating unit is further configured to:

select, from the primary set of resources, a third resource subset which has no intersection with the first resource subset; and allocate resources, from the third resource subset, to another terminal in the first cell, wherein the third resource subset has shared resources with the second resource subset.

* * * * *